United States Patent
Flaig et al.

(10) Patent No.: US 7,211,023 B2
(45) Date of Patent: May 1, 2007

(54) VARIATOR AND VARIATOR ARRANGEMENT

(75) Inventors: Armin Flaig, Schwaebisch Hall (DE); Guenther Ruehle, Loechgau (DE)

(73) Assignee: Getrag Getriebe-und Zahradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/352,957

(22) Filed: Feb. 13, 2006

(65) Prior Publication Data

US 2006/0189435 A1    Aug. 24, 2006

Related U.S. Application Data

(63) Continuation of application No. PCT/EP04/08669, filed on Aug. 3, 2004.

(30) Foreign Application Priority Data

Aug. 15, 2003  (DE) ................. 103 38 270

(51) Int. Cl.
*F16H 61/30* (2006.01)
(52) U.S. Cl. .................... 476/10; 476/42
(58) Field of Classification Search ........ 476/9, 476/10, 2, 1, 40, 41, 42, 46
See application file for complete search history.

(56) References Cited

U.S. PATENT DOCUMENTS 3,153,938 A * 10/1964 Perry ................. 476/10
4,499,782 A *  2/1985 Perry ................. 476/10
5,395,292 A *  3/1995 Fellows et al. ......... 476/10
6,071,209 A *  6/2000 Greenwood ........... 476/10

FOREIGN PATENT DOCUMENTS

| DE | 714 667 C | 12/1941 |
| EP | 425 914 A2 | 5/1991 |
| EP | 1 240 442 A | 9/2002 |
| JP | 07259947 A | 10/1995 |
| JP | 07280055 A | 10/1995 |
| WO | WO 90/05860 | 5/1990 |
| WO | WO 2004/027293 | 4/2004 |

* cited by examiner

*Primary Examiner*—David M. Fenstermacher
(74) *Attorney, Agent, or Firm*—Knobbe Martens Olson & Bear LLP

(57) ABSTRACT

A variator for a toroidal transmission, with a driving disk and with a driven disk, between which is set up a toroidal space which defines a toroidal reference circle. The variator, further, comprises at least two rollers which are arranged in the toroidal space for torque transfer between the driving disk and the driven disk. The rollers are in each case mounted rotatably on a roller carrier. The roller carriers are in each case spatially adjustable by means of a piston/cylinder arrangement, in order to adjust the transfer ratio of the variator. The pistons of the piston/cylinder arrangements are in each case adjustable along a stroke axis. Also, the pistons are connected to the roller carriers via respective levers.

21 Claims, 3 Drawing Sheets

VARIATOR AND VARIATOR ARRANGEMENT

CROSS REFERENCE TO RELATED APPLICATIONS

This application is a continuation of International Application PCT/EP2004/008669, filed on Aug. 3, 2004. This application is hereby incorporated by reference in its entirety.

BACKGROUND OF THE INVENTION

1. Field of the Invention

The present invention relates to a variator for a toroidal transmission, with a driving disk and with a driven disk, between which is set up a toroidal space which defines a toroidal reference circle, and with at least two rollers which are arranged in the toroidal space for torque transfer between the driving disk and the driven disk, the rollers being in each case mounted rotatably on a roller carrier, the roller carriers being in each case spatially adjustable by means of a piston/cylinder arrangement, in order to adjust the transfer ratio of the variator, and the pistons of the piston/cylinder arrangements being in each case adjustable along a stroke axis.

The present invention relates, furthermore, to a variator arrangement consisting of two or more variators of the type mentioned.

2. Description of the Related Art

In the field of transmissions, in particular of transmissions for motor vehicles, there is a trend toward continuously variable transmissions. Continuously variable transmissions, in general, make it possible to operate the internal combustion engine that is arranged in series with the transmission in motor vehicles, in a favorable rotational speed range independently of the respective vehicle speed. The efficiency of the drivetrain formed by the internal combustion engine and the continuously variable transmission is thereby improved. Furthermore, continuously variable transmissions afford a particularly high degree of driving comfort.

Among continuously variable transmissions, toroidal transmissions, as they are known, have particular importance, specifically especially because of their higher torque capacity, as compared with continuously variable wrap-around transmissions (CVTs).

Among toroidal transmissions, the Torotrak™ system is of particular significance (cf. www.torotrak.com). This transmission manages without an input-side starting clutch or a hydrodynamic torque converter. It is a full-toroidal transmission which is generally constructed in the manner of a countershaft transmission. The variator ensures a continuous adjustment of the ratio. A planet wheel set serves as a summing transmission.

The core of the toroidal transmission is the variator of the type initially mentioned or an arrangement consisting of a plurality of such variators.

In transmission designs put forward at the present time, the piston/cylinder arrangements for the spatial adjustment of the roller carriers are arranged tangentially with respect to the toroidal reference circle and spatially well outside the maximum diameter of the toroidal disks (driving and driven disk). As a result of this arrangement, the cylinders project well beyond the actual contour of the variator, the consequence of this being that the toroidal transmission, overall, has a large build in the radial direction (unfavorable packaging). On account of this, the designs of toroidal transmissions known at the present time can be fitted only with difficulty to the tunnel contour of vehicles having standard longitudinal drive trains.

SUMMARY OF THE INVENTION

Against the above background, the object of the present invention is to specify an improved variator for a toroidal transmission and a variator arrangement based on this.

In the variator initially mentioned, the above object is achieved in that the piston/cylinder arrangements are connected to the roller carriers via respective levers.

By virtue of the measure of providing a specific piston/cylinder arrangement for each roller, the cylinder surface of the individual piston/cylinder arrangements can be smaller than in the case of a single piston/cylinder arrangement for all the rollers. Furthermore, by means of the levers, it is possible to arrange the individual piston/cylinder arrangements more favorably, so that the construction space of the variator is reduced especially in the radial direction.

These advantages also apply to a variator arrangement with a plurality of such variators and to a toroidal transmission constructed thereby.

The above object is consequently achieved in full.

The lever systems of the respective rollers are preferably designed identically in kinematic terms, so that the stroke transfer ratios are the same, with the result that the division of the roller supporting forces is distributed uniformly over the circumference of the variator.

It is especially preferred if the levers are pivotably mounted in the toroidal transmission fixedly with respect to the housing.

A fixed reference point for the levers is thereby set up, so that the lever systems can be controlled more simply.

Furthermore, it is advantageous if the stroke axes of the piston/cylinder arrangements are in each case oriented approximately parallel to a tangent of the toroidal reference circle.

A short axial type of construction is thereby possible.

In this case, it is especially advantageous if the piston/cylinder arrangements are arranged in the region of the outer circumference of the driving or driven disk.

What is achieved thereby is that the variator also has a compact build in the radial direction.

It is, of course, in this case particularly preferred if the piston/cylinder arrangements are arranged between the driving and the driven disk, that is to say lie at least partially within the toroidal space.

In this embodiment, it is advantageous, furthermore, if the stroke axes of the piston/cylinder arrangements are arranged approximately perpendicularly with respect to the axis of the driving or driven disk.

As a result, once again, a particularly short axial and radial type of construction is achieved. In this case, the piston/cylinder arrangements preferably lie on a circular line which is arranged concentrically with respect to the toroidal reference circle. Particularly preferably, the circle formed by the piston/cylinder arrangements lies in the same plane as the toroidal reference circle.

Alternatively to this, however, it is also possible to arrange the stroke axes of the piston/cylinder arrangements approximately parallel to the axis of the driving or driven disk.

This form of construction, as a rule, leads to a somewhat more complicated lever system, but may likewise contribute to a significant reduction in construction size in the radial direction.

It is particularly preferred, overall, if the cylinders of the piston/cylinder arrangements are mounted on a common system carrier.

The outlay in structural terms is thereby reduced.

This applies likewise when the pistons are mounted on a common system carrier.

In this case, it is especially advantageous if the cylinders or pistons are produced in one piece with the system carrier.

The number of parts is thereby further reduced. Moreover, a compact type of construction is obtained.

According to a further exemplary embodiment preferred overall, the levers are mounted pivotably on a common system carrier.

The system carrier is in this case preferably mounted within the toroidal transmission fixedly with respect to the housing. The system carrier may be the same one on which the cylinders of the piston/cylinder arrangements are also secured.

As a result, once again, the outlay in structural terms is reduced.

It is advantageous, furthermore, if the roller carriers are connected to the associated lever in each case via a cardan or ball joint.

What is achieved thereby is that the roller carriers are movable spatially in a plurality of degrees of freedom (in particular, in an axial direction and rotatably about this axis). As a result, the necessary kinematic degrees of freedom of the roller carrier can consequently be implemented simply in structural terms in spite of the lever systems.

Overall, it is advantageous, furthermore, if the piston/cylinder arrangements and the roller carriers are articulated on the respective levers in such a way that the actuating force generated by the piston/cylinder arrangements is transferred, reinforced, to the respective roller carriers.

In this embodiment, the lever principle of mechanics is utilized to ensure that the roller carriers are movable with comparatively low actuating forces. The piston/cylinder arrangements can thereby be designed with a further reduced cross section. The construction space necessary for the variator is thereby further diminished.

According to a further preferred embodiment, a system carrier as a variator component fixed with respect to the housing is provided.

As already mentioned above, the system carrier may serve as a carrier for the cylinders and/or the levers. It may, however, also fulfill further tasks.

It is especially advantageous, in this case, if the system carrier is multipart.

What is achieved thereby is that the system carrier can possess higher functionality.

It is especially preferred if the system carrier has at least one fluid duct.

It is thereby possible to utilize the system carrier for the transportation of fluid, in particular oil.

In this case, it is especially advantageous if, in the case of a multipart system carrier, the fluid duct is formed by at least one groove which is located in one system carrier part and which is closed by another system carrier part.

The outlay in terms of the production of the fluid ducts is thereby markedly reduced.

According to a further preferred embodiment, the system carrier has a bearing point for a variator shaft.

It is thereby possible to utilize the system carrier for a further function. Thus, in a variator arrangement with two variators arranged next to one another, what can be achieved is that reaction forces arising from the drive power or driven power of the inner variator disk are not introduced into the variator. The variator shaft then remains free of transverse forces. A flexion of this shaft is avoided.

For comparable reasons, it may be advantageous if the system carrier has a bearing point for a countershaft.

According to a further preferred embodiment, the kinematics of the connection of the piston/cylinder arrangements to the respective levers are utilized to reduce the transverse movement of the rollers for achieving the ratio transfer.

As a result, the "stroke" can be reduced, specifically by a pivoting or tilting movement being superposed.

Alternatively to this, it is possible to utilize the kinematics of the connection of the piston/cylinder arrangements to the respective levers to increase the transverse movement of the rollers for achieving the ratio transfer.

This affords better regulatability.

In the variator arrangement according to the invention, it is especially advantageous if the two variators each have a system carrier, said system carriers being connected to one another by means of a connecting element.

The variator arrangement, overall, can thereby be constructed as a module, this simplifying mounting into the transmission.

The features mentioned above and those yet to be explained below can be used not only in the combination specified in each case, but also in other combinations or alone, without departing from the scope of the present invention.

BRIEF DESCRIPTION OF THE DRAWINGS

Exemplary embodiments of the invention are illustrated in the drawing and are explained in more detail in the following description. In the drawing.

DETAILED DESCRIPTION OF THE INVENTION

Figure 1:
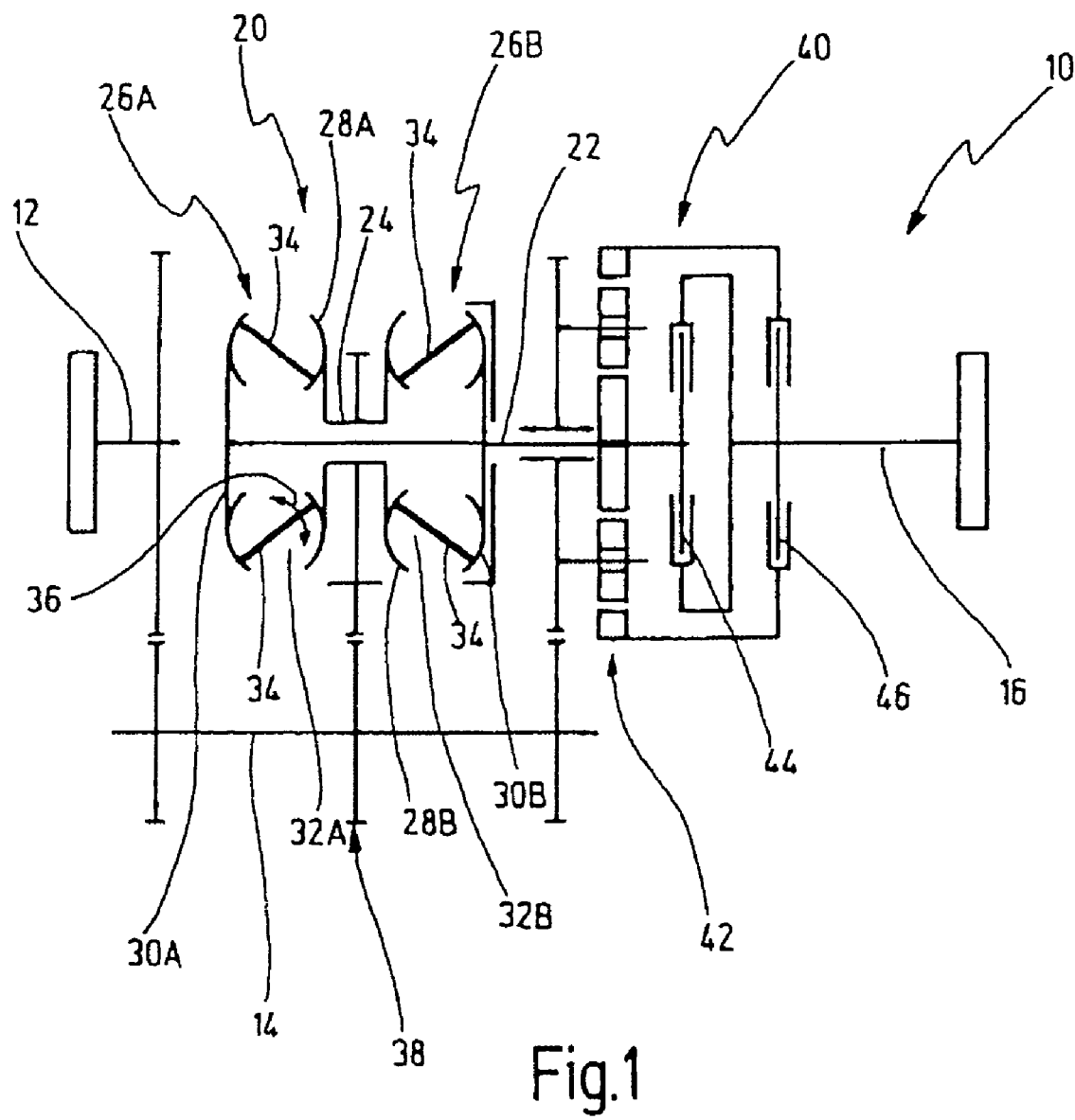
FIG. 1 shows a diagrammatic view of a toroidal transmission.

In FIG. 1, a diagrammatically illustrated toroidal transmission is designated in general by 10.

The toroidal transmission has a transmission input shaft 12, a countershaft 14 and a transmission output shaft 16.

A variator arrangement of the toroidal transmission 10 is shown at 20. The variator arrangement 20 has a variator main shaft 22 and a variator secondary shaft 24. The variator arrangement 20 contains, furthermore, two variators 26A, 26B.

Each variator has a driving disk 28A, 28B and a driven disk 30A, 30B.

The driving disks 28A, 28B enclose, together with the respective driven disks 30A, 30B, in each case a toroidal space 32A, 32B.

A plurality of rollers 34, as a rule three rollers 34 in each case, are arranged in each case in the toroidal spaces 32A, 32B so as to be distributed circumferentially over the toroidal space.

The rollers 34 can be adjusted spatially within the toroidal space 32 by means of an actuator mechanism, not illustrated in any more detail, as is shown diagrammatically at 36, in order to vary the transfer ratio of the variator arrangement 20. In this case, it goes without saying that all the rollers 34 of the variators 26A, 26B are adjusted codirectionally, so that the reaction forces occurring can be absorbed uniformly over the circumference of the variator arrangement 20.

At 38, a wheel set is shown, which connects the countershaft 14 in the manner of a constant to the variator secondary shaft 24 to which the driving disks 28A, 28B are secured. The driven disks 30A, 30B are secured to the variator main shaft 22 which is connected to a summing transmission 40.

The summing transmission 40 has a planet wheel set 42. The variator main shaft 22 is connected to the sun wheel of the planet wheel set 42. The countershaft is connected to the planet carriers of the planet wheel set 42 via a further wheel set (not designated.

The sun wheel is connectable to the transmission output shaft 16 via a high-regime clutch 44. The ring wheel of the planet wheel set 42 is connectable to the transmission output shaft 16 via a low-regime clutch 46.

The functioning of the toroidal transmission 10 is generally known and is not described in detail here for the sake of compact illustration.

Figure 2:
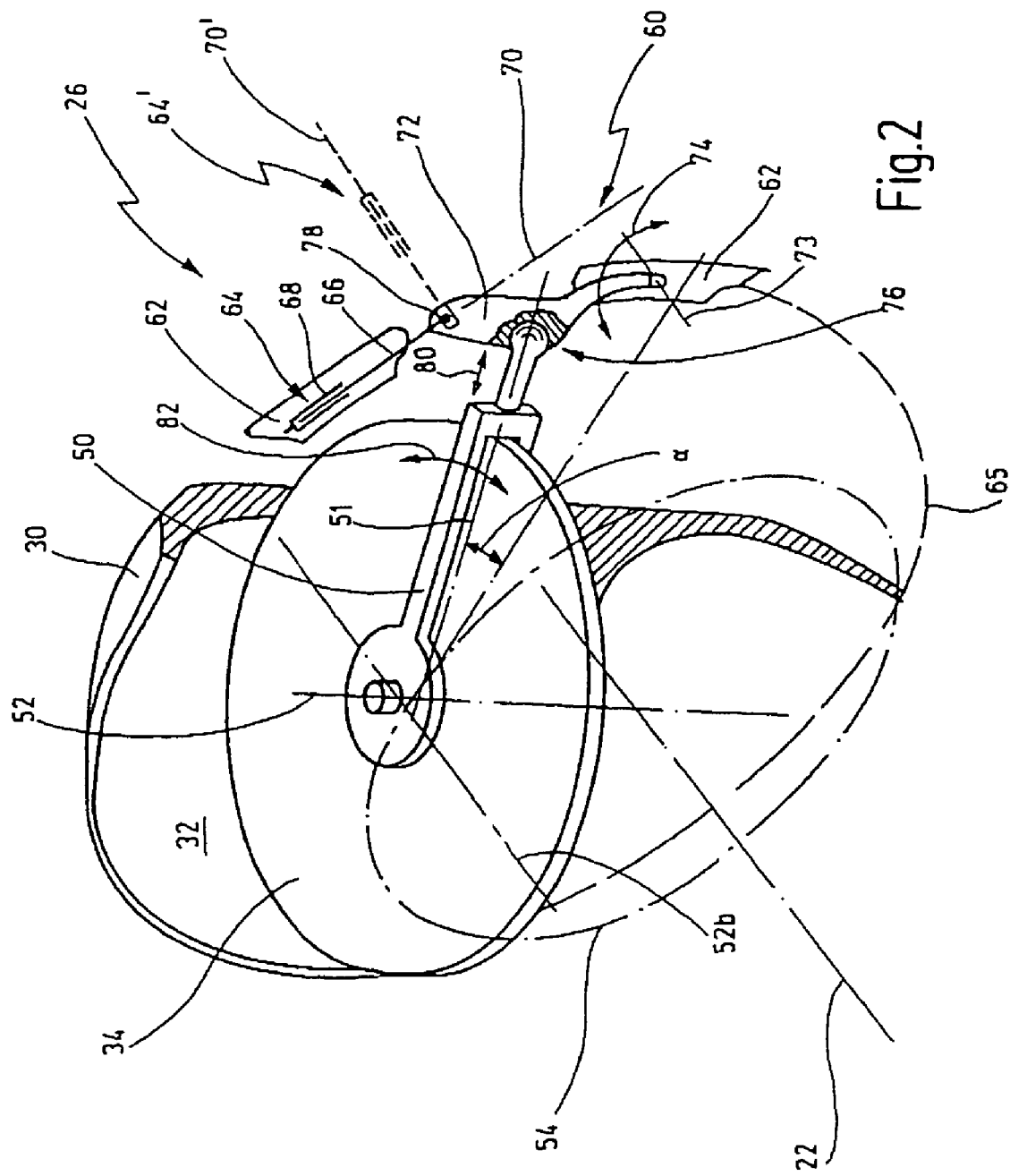
FIG. 2 shows a partially cut away diagrammatic perspective view of a variator according to the invention.

FIG. 2 shows a partially cut away diagrammatic perspective view of part of a variator 26 according to the invention. The variator 26 may be used as the variators 26A, 26B of the variator arrangement 20 in the toroidal transmission 10 of FIG. 1.

The variator 26 has a driving disk 28 (not illustrated) and a driven disk 30 which enclose a toroidal space 32. Furthermore, three rollers 34, of which one roller 34 is illustrated in FIG. 2, are arranged in the toroidal space 32 so as to be distributed circumferentially.

The roller 34 is mounted rotatably on a fork-like roller carrier 50. The longitudinal axis of the roller carrier 50 is designated by 51. The axis of rotation of the roller 34 on the roller carrier 50 is designated by 52.

A toroidal reference plane 54 of the toroidal space 32 is oriented perpendicularly with respect to the variator main shaft 22 which is illustrated diagrammatically in FIG. 2 as an axis.

The variator 26 has, furthermore, an adjusting device, designated in general by 60, for the roller carrier 50. The adjusting device 60 is arranged on a system carrier 62 which is fixed with respect to the housing and which is arranged parallel to the toroidal reference plane 54. Only part of the system carrier 62 is illustrated in FIG. 2 for the sake of a clearer illustration.

A piston/cylinder arrangement 64 is arranged on the system carrier 62. The piston/cylinder arrangement 64 lies approximately in the region of the circumference 65 of the driven disk 30 in the radial direction.

The piston/cylinder arrangement 64 has a cylinder 68 secured to the system carrier 62 and a piston 66 which is displaceable along a stroke axis 70. In the illustration of FIG. 2, the stroke axis 70 is oriented approximately tangentially with respect to the circumference 65 of the driven disk 30 and runs approximately perpendicularly with respect to the axis 22.

The piston 66 is connected to a lever 72. The lever 72 is mounted on the system carrier 62 pivotably about a lever axis 73. The lever axis 73 is generally oriented approximately parallel to the axis 22. The pivotability of the lever 72 is indicated diagrammatically at 74.

Approximately in a middle region of the lever 72, the latter has arranged on it a ball joint 76, on which one end of the roller carrier 50 is mounted in an articulated manner.

The piston 66 is articulated approximately in the region of the free end of the lever 72, specifically by means of a guide 78 indicated diagrammatically.

The adjusting device 60 or the lever mechanism formed thereby is designed such that a castor angle $\alpha$ is set up between the toroidal reference plane 54 and the longitudinal axis 51 (roller pivot axis) of the roller carrier 50.

The lever 72 can be deflected about the lever axis 73 as the result of an actuation of the piston/cylinder arrangement. This gives rise to a spatial adjustment of the roller carrier 50 which is composed of linear movements, as are illustrated diagrammatically at 80, and of rotational movements about an axis 52b of the roller carrier 50, as shown diagrammatically at 82. The axis 52b runs approximately parallel to the axis 22.

The lever ratios during the adjustment operation can be set up by suitable choice of the location of the ball joint 76 (or of a corresponding cardan joint) and of the location of articulation of the piston 66 on the lever 72 in such a way that force intensification can be achieved. It is thereby possible for the cylinder surface of the piston/cylinder arrangement 64 to be small, so that the piston/cylinder arrangement can easily be integrated into the variator 26 in structural terms.

It goes without saying that corresponding adjusting devices 60 for the other two rollers (not illustrated) of the variator 26 are similarly arranged, distributed circumferentially, on the system carrier 62.

The three piston/cylinder arrangements 64 of the variator 26 are activated parallel to one another and codirectionally by means of a control device, not illustrated in any more detail. Furthermore, the lever ratios in all three adjusting devices 60 are designed identically. The stroke transfer ratios are likewise selected identically.

By the piston/cylinder arrangements 64 being arranged tangentially around the outer circumference of the disks 28, 30 of the variator 26, the piston/cylinder arrangements 64 enclose approximately a circle which is arranged concentrically with respect to the outer circumference 65. Ideally, the piston/cylinder arrangements 64 may be arranged directly between the disks 28, 30 of the variator 26. For structural reasons, however, it is necessary, where appropriate, for the piston/cylinder arrangements 64 to extend slightly beyond the circumference 65. In this case, the stroke axes 70 run in each case parallel to a tangent of the outer circumference 65.

Although it is naturally preferred if the piston/cylinder arrangements 64 are arranged on a common system carrier 62, they may also in each case be individually arranged fixedly with respect to the housing via suitable means.

In an alternative embodiment, the piston/cylinder arrangements are arranged in the region of the circumference 65 of the disks 28, 30 of the variator 26, but rotated through 90°, as indicated diagrammatically at 64'. The corresponding stroke axis 70' of this modified piston/cylinder arrangement 64' then runs approximately parallel to the axis 22. In this case, it may be necessary to provide a multimembered lever mechanism for adjusting the roller carrier 50.

Figure 3:
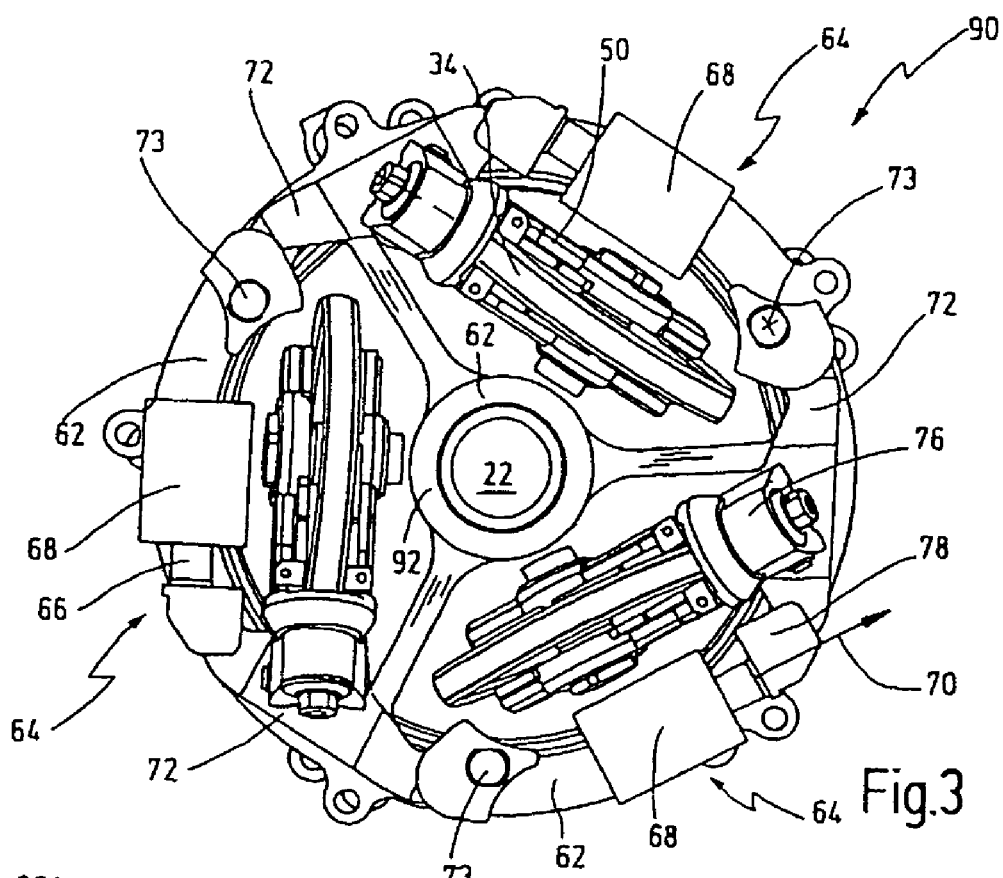
FIG. 3 shows a side view of a further embodiment of the variator according to the invention.

FIG. 3 illustrates an implementable embodiment of a variator module 90 for a variator 26. The variator module 90 is constructed according to the principles which were explained in relation to the variator 26 of FIG. 2 or its adjusting device 60. Only differences from this are dealt with below.

The variator module 90 has a system carrier 62. The system carrier 62 has an annular disk to which the levers 72 are articulated and the cylinders 68 of the piston/cylinder arrangements 64 are secured. The cylinders 68 may be secured to the system carrier 62 in any desired way. They may also be produced in one piece with this.

The annular disk of the system carrier 62 is connected via three radial webs to a hub 92 of the system carrier 62, said hub being arranged around the variator main shaft 22. The variator main shaft 22 is mounted within the hub 92 rotatably in relation to the system carrier 62 fixed with respect to the housing.

The variator module 90 contains, furthermore, the three roller carriers 50 with the rollers 34 mounted in each case on them.

The variator module 90 can be preassembled before being fitted into the variator 26. If suitable hydraulic fluid connections are provided, it is even possible to test the variator module 90 for functioning capacity and to vent it before it is fitted into the variator 26. Furthermore, the assembly of the variator 26 is simplified.

Figure 4:
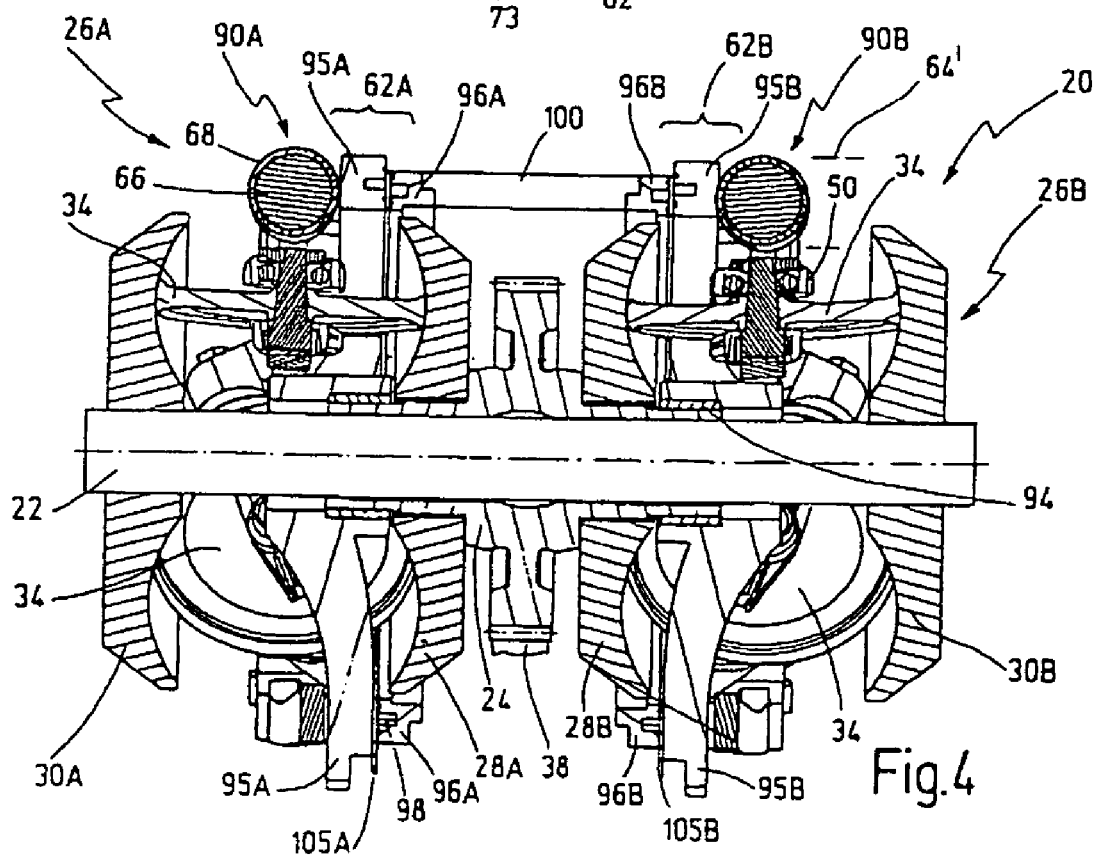
FIG. 4 shows a longitudinal sectional view through a variator arrangement according to the invention with two variators.

FIG. 4 shows a variator arrangement 20 (cf. FIG. 1) with two variators 26A, 26B arranged next to one another on a variator main shaft 22.

The variators 26A, 26B are constructed according to the same basic principles as the variator 26 of FIG. 2. Furthermore, the variators 26A, 26B contain in each case a variator module 90A and 90B according to FIG. 3.

It is illustrated, at 94, that the variator secondary shaft 24 is mounted on the system carriers 62A, 62B, and the variator main shaft 22 is also mounted indirectly above that.

In the embodiment illustrated, the system carriers 62A, 62B are constructed in two parts and consist of a first carrier 95 and of a further carrier 96. The first carrier 95 possesses the same function as the system carrier 62 described with reference to FIG. 3. That is to say, the first carrier 95 supports the levers 72 and the piston/cylinder arrangements 64.

The further carrier 96 is arranged adjacent to the first carrier 95. The carriers 95, 96 bear closely one against the other. On the further carrier 96 (and/or on the first carrier 95), one or more grooves are formed, which, in conjunction with the other carrier 95 or 96 in each case, serve as hydraulic fluid ducts (oil ducts) 98. Consequently, the system carriers 62A, 62B may also be used for the routing of hydraulic fluid into the interior of the toroidal space 32.

Finally, it is shown that the system carriers 62A, 62B are connected rigidly to one another via a connecting element 100.

In this embodiment, it is possible to produce the variator arrangement 20 as a prefabricated module which is subsequently fitted into the toroidal transmission 10.

The following additionally applies, in general, to the variator according to the invention and the variator arrangement according to the invention:

The adjusting devices 60 are identical, in particular with regard to the piston-travel transfer function. As a result, deviations in ratio transfer during adjustment operations are minimal, and consequently the efficiencies are improved, as compared with the prior art.

By virtue of a suitable arrangement of the levers 72, the tilting of the roller axis 52 generated by their pivoting movement may be designed such that the transfer ratio adjustment is reinforced. The required pivoting movement of the levers 72 for covering the entire transfer ratio range can thereby be reduced. This diminishes the construction space requirement of the adjusting device 60.

The tilting of the roller axis 52 generated by the pivoting movement of the levers 72 may likewise be designed such that it counteracts the transfer ratio adjustment. As a result, the transfer ratio adjustment by means of the adjusting device 60 becomes more sluggish, and therefore regulation can be designed to be less dynamic. This affords advantages in terms of the regulation/control of the transmission.

As regards the abovementioned hydraulic fluid ducts 98, it must be mentioned that the ducts may also be sealed off by means of an intermediate plate 105 between the system carrier parts 95, 96.

The system carriers 62 may have in each case bearing points for a variator main shaft 22. As a result, reaction forces arising from the drive power or driven power of the inner variator disks 28A and 28B are not introduced into the variator 26. The variator main shaft 22 is then free of transverse forces. Furthermore, a flexion of the variator main shaft 22 is avoided.

Furthermore, the system carriers 62 may have (not illustrated) bearing points for the countershaft 14. The flexion of the countershaft 14 can thereby be reduced. The bearing reactions of the drive power or driven power of the respective variator are then absorbed by the system carrier 62 and load the housing of the toroidal transmission 10 to a lesser extent.

The position of the rollers 34 within the toroidal space (cavity) 32 of the full-toroidal variator 26 according to the invention determines the transfer ratio of the variator 26 via geometric relations. If the position of the rollers 34 in the toroidal space 32 is changed, then the transfer ratio also changes via the kinematics and the geometry. In the prior art with radially oriented piston/cylinder arrangements, the rollers 34 and the roller carriers 50 are displaced tangentially with respect to the toroidal reference circle 54 by means of these piston/cylinder arrangements. The transfer ratio change is thereby initiated. The hydraulic pressure and consequently the force of the piston/cylinder arrangements then determine the torque transmittable in the variator 26.

In the embodiment according to the invention, the roller carriers 50 are no longer connected directly to the piston/cylinder arrangements, but, instead, via the respective levers 72. When a movement is imparted to the pistons 66 of the piston/cylinder arrangements 64, this movement is transferred to the roller carriers 50 via the levers 72 and a transfer ratio change likewise results. The kinematics of the roller carriers 50 are in this case designed such that they adapt to the movement of the roller carriers of the prior art. In this case, a resulting tilting movement about the axis 52b of the rollers 34 is utilized to reduce the transverse movement of the rollers 34, as compared with the known solution, in order to achieve a specific transfer ratio.

The guides 78 of the pistons 66 on the levers 72 may be achieved, for example, by means of a slotted link, the required groove being arranged on the piston and the sliding element being arranged on the lever, or vice versa.

Alternatively, the tie-up may also take place by means of a joint between piston and lever. In this case, the cylinder is then tied to the housing or to the system carrier in an articulated manner. The joint may be designed as a ball joint in the piston.

What is claimed is:

1. A variator for a toroidal transmission, with a driving disk and with a driven disk, between which is set up a toroidal space which defines a toroidal reference circle, and with at least two rollers which are arranged in the toroidal space for torque transfer between the driving disk and the driven disk, the rollers being in each case mounted rotatably on a roller carrier, the roller carriers being in each case spatially adjustable by means of a piston/cylinder arrangement, in order to adjust the transfer ratio of the variator, and the pistons of the piston/cylinder arrangements being in each case adjustable along a stroke axis, wherein the piston/cylinder arrangements are connected to the roller carriers via respective levers, wherein the roller carriers in each case are connected to the associated lever by means of a ball joint, and wherein the levers are mounted pivotably on a common system carrier.

2. The variator as claimed in claim 1, wherein the levers are pivotably mounted in the toroidal transmission fixedly with respect to the housing.

3. The variator as claimed in claim 1, wherein the stroke axes of the piston/cylinder arrangements are oriented in each case approximately parallel to a tangent of the toroidal reference circle.

4. The variator as claimed in claim 3, wherein the piston/cylinder arrangements are arranged in the region of the outer circumference of the driving or driven disk.

5. The variator as claimed in claim 4, wherein the stroke axes of the piston/cylinder arrangements are arranged approximately perpendicularly with respect to the axis of the driving or driven disk.

6. The variator as claimed in claim 4, wherein the stroke axes of the piston/cylinder arrangements are arranged approximately parallel to the axis of the driving or driven disk.

7. The variator as claimed in claim 1, wherein the cylinders of the piston/cylinder arrangements are mounted on a common system carrier.

8. The variator as claimed in claim 7, wherein the cylinders are produced in one piece with the system carrier.

9. The variator as claimed in claim 1, wherein the pistons of the piston/cylinder arrangements are mounted on a common system carrier.

10. The variator as claimed in claim 9, wherein the pistons are produced in one piece with the system carrier.

11. The variator as claimed in claim 1, wherein the roller carriers are connected to the associated lever in each case via a cardan joint.

12. The variator as claimed in claim 1, wherein the piston/cylinder arrangements and the roller carriers are articulated on the respective levers in such a way that the actuating force generated by the piston/cylinder arrangements is transmitted, reinforced, to the respective roller carriers.

13. The variator as claimed in claim 1, wherein a system carrier as a variator component fixed with respect to the housing is provided.

14. The variator as claimed in claim 13, wherein the system carrier is multipart.

15. The variator as claimed in claim 13, wherein the system carrier has at least one fluid duct.

16. The variator as claimed in claim 13, wherein the system carrier is multipart and has at least one fluid duct, the fluid duct being formed by at least one groove which is located in one system carrier part and which is closed by another system carrier part.

17. The variator as claimed in claim 13, wherein the system carrier has a bearing point for a variator shaft.

18. The variator as claimed in claim 13, wherein the system carrier has a bearing point for a countershaft.

19. The variator as claimed in claim 1, wherein the kinematics of the connection of the piston/cylinder arrangements to the respective levers are utilized to reduce the transverse movement of the rollers for achieving the ratio transfer.

20. The variator as claimed in claim 1, wherein the kinematics of the connection of the piston/cylinder arrangements to the respective levers are utilized to increase the transverse movement of the rollers for achieving the ratio transfer.

21. A variator for a toroidal transmission, with a driving disk and with a driven disk, between which is set up a toroidal space which defines a toroidal reference circle, and with at least two rollers which are arranged in the toroidal space for torque transfer between the driving disk and the driven disk, the rollers being in each case mounted rotatably on a roller carrier, the roller carriers being in each case spatially adjustable by means of a piston/cylinder arrangement, in order to adjust the transfer ratio of the variator, and the pistons of the piston/cylinder arrangements being in each case adjustable along a stroke axis, wherein the piston/cylinder arrangements are connected to the roller carriers via respective levers, wherein the levers are mounted pivotably on a common system carrier, wherein the system carrier is multipart and has at least one fluid duct that is formed by at least one groove which is located in one system carrier part and which is closed by another system carrier part.

* * * * *